United States Patent
Sundholm

(10) Patent No.: US 7,353,782 B2
(45) Date of Patent: Apr. 8, 2008

(54) METHOD AND APPARATUS IN A SPRAYING APPARATUS

(75) Inventor: Göran Sundholm, Tuusula (FI)

(73) Assignee: Marioff Corporation Oy, Vantaa (FI)

( * ) Notice: Subject to any disclaimer, the term of this patent is extended or adjusted under 35 U.S.C. 154(b) by 0 days.

(21) Appl. No.: 10/511,940

(22) PCT Filed: Apr. 16, 2003

(86) PCT No.: PCT/FI03/00304

§ 371 (c)(1),
(2), (4) Date: Oct. 19, 2004

(87) PCT Pub. No.: WO03/089778

PCT Pub. Date: Oct. 30, 2003

(65) Prior Publication Data

US 2005/0235928 A1    Oct. 27, 2005

(30) Foreign Application Priority Data

Apr. 19, 2002   (FI) .................................. 20020755

(51) Int. Cl.
*F02M 25/028* (2006.01)
(52) U.S. Cl. ..................................................... 123/25 A
(58) Field of Classification Search .... 123/25 A–25 F, 123/25 J, 25 P, 25 N; 239/291–292, 553.5
See application file for complete search history.

(56) References Cited

U.S. PATENT DOCUMENTS

| | | | |
|---|---|---|---|
| 1,491,376 A | 4/1924 | Bochet | |
| 4,302,481 A | 11/1981 | Ribnitz et al. | |
| 4,459,943 A * | 7/1984 | Goodman | 123/25 J |
| 5,133,301 A * | 7/1992 | Hsu | 123/23 |
| 6,415,745 B1 * | 7/2002 | Hellen et al. | 123/25 R |

FOREIGN PATENT DOCUMENTS

EP          0396223 A2       11/1990

* cited by examiner

*Primary Examiner*—Stephen K. Cronin
*Assistant Examiner*—Hyder Ali
(74) *Attorney, Agent, or Firm*—Ladas & Parry LLP

(57) ABSTRACT

A method and apparatus in a spraying apparatus or humidifier for intake air, the apparatus having at least one spraying nozzle for spraying a first pressure medium, liquid and/or gas into the intake air conveys a second pressure medium, liquid and/or gas to the nozzle or continues the supply of the first pressure medium, liquid and/or gas to the nozzle at a substantially lower pressure after a supply of the first pressure medium, liquid and/or gas for the spraying has been interrupted to prevent clogging of the nozzle, and the second pressure medium, liquid and/or gas is introduced into a feed channel of the nozzle at a point between a valve element and the nozzle.

5 Claims, 1 Drawing Sheet

METHOD AND APPARATUS IN A SPRAYING APPARATUS

BACKGROUND OF THE INVENTION

The present invention relates to a method as defined in the preamble of claim 1 in a spraying apparatus, especially a spraying apparatus intended for the humidification of intake air, said apparatus comprising at least one spraying nozzle for spraying a liquid and/or gas into the intake air.

The invention also relates to an apparatus as defined in the preamble of claim 4.

The exhaust gases of piston engines, in particular diesel engines, contain many kinds of noxious combustion products. At the high combustion temperatures, the combustion process in the cylinder of a piston engine produces nitrogen oxides (NOx), which are emitted together with the exhaust gases into the atmosphere. Because of the negative environmental effects of nitrogen oxide emissions, efforts are undertaken to minimize their production.

As is known, adding water to the combustion process reduces the generation of nitrogen oxides. This phenomenon is based on the cooling effect of water. In practice, the introduction of water into the combustion process in a piston engine is often implemented by injecting water into the intake air. These arrangements are advantageous in respect of the shaft efficiency of the engine. The maximum amount of water introduced into the combustion space of the engine may be that amount which will remain in gaseous form in the intake air pressure and temperature conditions. Clogging of the nozzles feeding water into the intake air is very undesirable because it has an effect of reducing the amount of water injected and thus increasing the amount of nitrogen oxides emitted into the environment. Disturbances in the apparatus humidifying the intake air lead to an increases of nitrogen oxide emissions. Maintaining the nozzles of the spraying apparatus, even when the humidification function performed by them is interrupted, is very important. The conditions prevailing in the air intake duct promote clogging of the nozzles.

The object of the present invention is to achieve a completely new type of method in connection with a spraying apparatus that makes it possible to maintain the nozzles in working order.

Another object of the invention is to achieve a spraying apparatus in which the nozzles are preserved in working order.

The method of the invention is characterized in that, after the supply of the liquid and/or gas to be sprayed to the nozzle has been interrupted, a second medium, such as a liquid and/or gas, is supplied to the nozzle to prevent clogging of the nozzle.

The method of the invention is additionally characterized by what is stated in claims 2-3.

The apparatus of the invention is characterized by what is stated in claims 4-5.

The solution of the invention has numerous significant advantages. By supplying a pressure medium into the nozzles even when they are not in active use, their clogging is avoided. At the same time, malfunctions caused by the nozzles of the spraying apparatus are minimized. The increase of nitrogen oxide emissions due to equipment disturbances is thus avoided.

BRIEF DESCRIPTION OF THE DRAWINGS

In the following, the invention will be described in detail by the aid of an example with reference to the attached drawing, wherein.

BRIEF DESCRIPTION OF THE INVENTION

Figure 1:
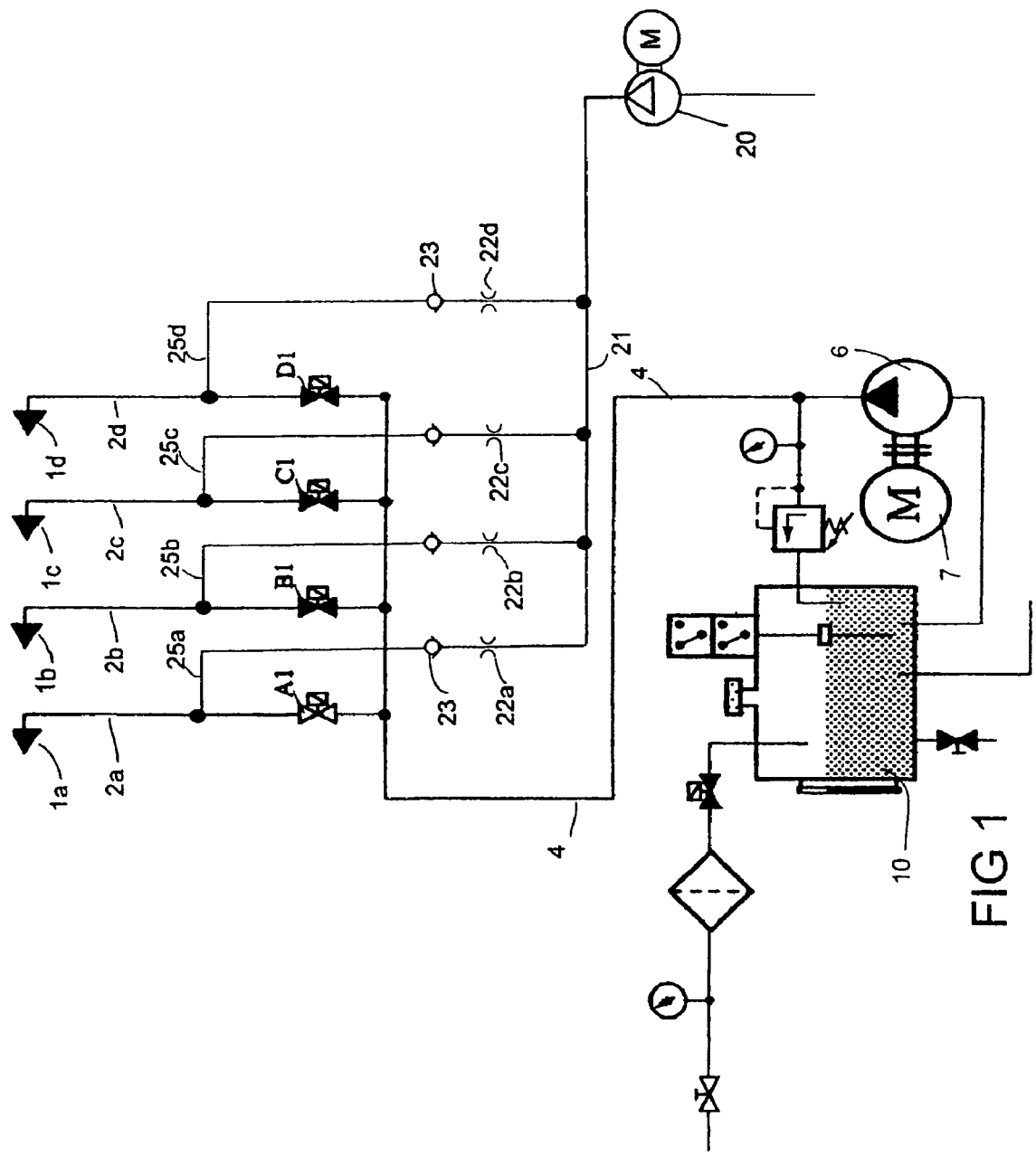
FIG. 1 represents an apparatus according to the invention.

FIG. 1 presents a diagram schematically representing a method and apparatus according to the invention. The method of the invention in a spraying apparatus, especially in a spraying apparatus intended for the humidification of intake air, said apparatus comprising at least on nozzle 1a, 1b, 1c, 1d for injecting a liquid into the intake air. In the method, after the supply of the liquid and/or gas to be injected to the nozzle 1a, 1b, 1c, 1d has been interrupted, a second pressure medium, liquid and/or gas, is conveyed to the nozzle, or the supply of the first pressure medium to the nozzle is continued at a substantially lower pressure to prevent clogging of the nozzle. The second pressure medium is supplied into the nozzle feed channel 2a, 2b, 2c, 2d at a pressure considerably lower than the pressure used for actual humidification of intake air.

The second pressure medium is introduced into the nozzle feed channel 2a, 2b, 2c, 2d at a point between a valve element A1, B1, C1, D1 and the nozzle 1a, 1b, 1c, 1d. The valve A1, B1, C1, D1 is opened/closed by means of the nozzles spraying the first pressure medium used for actual intake air humidification. A check valve 23 is used to prevent the admission of the first pressure medium into the feed channel 25a, 25b, 25c, 25d of the second pressure medium. A supply pressure is maintained in the supply pipe 21 of the second pressure medium.

The apparatus in a spraying apparatus, especially in a spraying apparatus intended or the humidification of intake air, said apparatus comprising at least one spraying nozzle 1a, 1b, 1c, 1d for injecting a liquid into the intake air, The apparatus comprises means 20, 21, 25a, 25b, 25c, 25d for conveying a second pressure medium to the nozzle 1a, 1b, 1c, 1d after the supply of a first pressure medium, such as a liquid and/or gas, intended for the humidification of intake air to the nozzle has been interrupted, to prevent clogging of the nozzle. The apparatus comprises a pressure medium source, such as a pump 20 pumping pressurized air, and means for conveying the pressure medium from the pressure medium source to the nozzle 1a, 1b, 1c, 1d. For conveying the second pressure medium, a pipeline 25a, 25b, 25c, 25d connected in the nozzle feed channel 2a, 2b, 2c, 2d between a valve element A1, B1, C1, D1 and the nozzle 1a, 1b, 1c, 1d is used. Each pipeline 25a, 25b, 25c, 25d used for supplying the second pressure medium is provided with a check valve 23 to prevent the first pressure medium from flowing through the supply channel to the other nozzles and/or into the pressure medium source. The second pressure medium is a liquid and/or gas.

The system comprises at least two nozzles 1a, 1b, 1c, 1d, which are disposed in the engine's air intake duct or in a corresponding space leading to the combustion chamber of the engine for humidification of the intake air. In the case presented in the figure, four nozzles are shown, with a channel 2a, 2b, 2c, 2d leading to each nozzle from a supply pipe 4 supplying a pressure medium, preferably an aqueous liquid. The pressure medium is fed into the supply pipe by a pump 6, driven by a drive device 7. The pump pumps the pressure medium from a pressure medium source 10, such as tank. The pump drive device is preferably a motor, such as an electrically opened motor. The channels 2a, 2b, 2c, 2d leading to the nozzles are provided with valve elements A1, B1, C1, D1, which can be opened and closed according to the instructions of a control system. The control system typically controls the valves A1, B1, C1, D1 and/or the pump drive motor according to the required amount of liquid to be sprayed, preferably according to the load of the engine into whose intake air the liquid mist is being injected, so the amount of liquid supplied through the nozzles 1a, 1b, 1c, 1d into the intake air typically increases with the engine load.

Arranged in connection with the spraying apparatus is a second pressure medium source 20, e.g. pump unit for pumping pressurized air. The second pressure medium is supplied through a supply pipe 21 into the channel 2a, 2b, 2c, 2d leading to the nozzles 1a, 1b, 1c, 1d via second feed channels 25a, 25b, 25c, 25d. The feed channels 25a, 25b, 25c, 25d are connected to the channels leading to the nozzles at a point between valve elements A1, B1, C1, D1 and the nozzles 1a, 1b, 1c, 1d. When the control system gives a signal and, at least one of the first valve elements A1, B1, C1, D1 is opened, the first pressure medium, typically water to be injected can enter into the second feed channel 25a, 25b, 25c, 25d arranged between the valves and the nozzles. A second pressure medium, such as a liquid or gas or a mixture of these, is supplied through the feed channels 25a, 25b, 25c, 25d to the nozzles not in use. The second pressure medium is typically pressurized air or water. The pressure of the second pressure medium is typically lower than the pressure of the first pressure medium in the supply pipe 4. Therefore, when first valve element A1, B1, C1, D1 is opened, the first pressure medium can enter the second feed channel 25a, 25b, 25c, 25d regardless of the pressure of the second pressure medium acting there. Each one of the second feed channels 25a, 25b, 25c, 25d is provided with a check valve 23 to prevent the first pressure medium from entering the second supply pipe 21. After the nozzle has stopped spraying, the system works in the converse manner. Thus, when the first valve element is closed, the pressure in the second supply channel falls. The second pressure medium is now able to enter the second feed channel, forcing the first pressure medium remaining there to flow before it into the nozzle. The second pressure medium is allowed to flow through the nozzle, thus preventing the nozzles from becoming clogged in the air intake duct. The pressure of the second pressure medium in the piping is e.g. 6 bar. The supply pressure of the first pressure medium in the piping during the humidification of intake air is of the order of 10-300 bar. During the cleaning of the valve, the pressure is below 10 bar, preferably below 7 bar, yet typically higher than the pressure in the air intake ductwork in the area of the nozzle.

In case a so-called "twin-fluid" nozzle having feed channels for two pressure mediums, typically a liquid and a gas, is used, the method of the invention works in connection with the twin-fluid nozzle in such manner that, after the supply of liquid has stopped, operation is continued by supplying gas, typically at a lower pressure.

The nozzles in the spraying head may have different properties, which have been adapted according to the placement of each nozzle. The form of the spraying head, the number of nozzles and their orientation may vary depending on the application. It is also possible to supply different mediums to the nozzle, such as water and gas. The figure does not show the nozzles in detail, but they may be replaceable depending on the application.

The nozzles are therefore of a type such that they produce a spray of fine mist when supplied with liquid under a high pressure. Many kinds of nozzles of this category are known, e.g. from fire extinguishing technology employing water mist. For example, specifications WO 92/20454 and WO 94/06567 disclose nozzles that produce a water mist at a high pressure. Naturally, other types of nozzles may also be used, e.g. specification WO 01/45799 discloses yet another nozzle.

The amount of water supplied through the nozzles typically increases with increasing load and/or rotational speed of the engine. Thus, when the engine load is low, it is possible to supply water only to some of the nozzles of the spraying head and increase the number of nozzles spraying when the load increases. Similarly, the spraying head can be provided with nozzles having different properties, such as size of the nozzle aperture, droplet size produced by the nozzle, etc. It is thus possible to form different combinations which can be adapted to a wide range of different applications of the spraying head, different engine types, different placements and conditions.

The apparatus employing the spraying head of the invention is able to make full use of the heat quantity required for the vaporization of water, cooling the intake air at each spray injection point to a temperature close to the wet bulb temperature (or adiabatic saturation temperature, which in the case of a water-air mixture is practically the same thing), i.e. to the temperature to which the air temperature can be reduced by vaporization of water.

Thus, the humidity of the gas entering the cylinder and therefore the formation of nitrogen oxides is controlled within desired limits.

It is obvious to the person skilled in the art that the invention is not limited to the embodiments described above, but that it may be varied within the scope of the claims presented below.

The invention claimed is:

1. In an intake-air method of a spraying apparatus for humidification of intake air of an engine, said apparatus comprising at least one spraying nozzle (1a, 1b, 1c, 1d) in an intake duct of the engine for spraying a first pressure medium liquid and/or gas into the intake air, the improvements in that:

after supply of the first pressure medium liquid and/or gas for the spraying has been interrupted, a second pressure medium liquid and/or gas is conveyed to the nozzle, or the supply of the first pressure medium liquid and/or gas to the nozzle is continued at a substantially lower pressure to prevent clogging of the nozzle (1a, 1b, 1c, 1d); and the second pressure medium is supplied into the feed channel (2a, 2b, 2c, 2d) of the nozzle (1a, 1b, 1c, 1d) at a pressure considerably lower than the pressure used for actual humidification of intake air.

2. Method in a spraying apparatus or humidifier for intake air, said apparatus comprising at least one spraying nozzle (1a, 1b, 1c, 1d) for spraying a first pressure medium liquid and/or gas into the intake air, characterized in that:

after a supply of the first pressure medium liquid and/or gas for the spraying has been interrupted, a second pressure medium liquid and/or gas is conveyed to the nozzle, or the supply of the first pressure medium liquid and/or gas to the nozzle is continued at a substantially lower pressure to prevent clogging of the nozzle (1a, 1b, 1c, 1d), and the second pressure medium liquid and/or gas is introduced into a feed channel (2a, 2b, 2c, 2d) of the nozzle at a point between a valve element (A1, B1, C1, D1) and the nozzle (1a, 1b, 1c, 1d).

3. Method according to claim 2, characterized in that the second pressure medium is supplied into the feed channel (2a, 2b, 2c, 2d) of the nozzle (1a, 1b, 1c, 1d) at a pressure considerably lower than pressure of the intake air.

4. Apparatus in a spraying apparatus or humidifier for intake air, said apparatus comprising at least one spraying nozzle (1a, 1b, 1c, 1d) for spraying a first pressure medium liquid and/or gas into the intake air, characterized by
   means for conveying a second pressure medium liquid and/or gas to the nozzle after supply of the first pressure medium liquid and/or gas to the nozzle has been interrupted to prevent clogging of the nozzle,
   wherein the second pressure medium liquid and/or gas is conveyed using a pipeline (25a, 25b, 25c, 25d) connected in a nozzle feed channel (2a, 2b, 2c, 2d) at a point between a valve element (A1, B1, C1, D1) and the nozzle (1a, 1b, 1c,1d).

5. Apparatus according to claim 4, characterized in that each pipeline (25a, 25b, 25c, 25d) used for supplying the second pressure medium is provided with a check valve to prevent the admission of the first pressure medium.

\* \* \* \* \*